United States Patent
Jangam et al.

(10) Patent No.: US 10,296,454 B2
(45) Date of Patent: May 21, 2019

(54) GRANULAR UNMAPPING WITH VARIABLE ADDRESSING IN A DATA STORE

(71) Applicant: VMWARE, INC., Palo Alto, CA (US)

(72) Inventors: Prasad Rao Jangam, Palo Alto, CA (US); Asit Desai, Palo Alto, CA (US); Prasanna Aithal, Bangalore (IN); Bryan Branstetter, Palo Alto, CA (US); Mahesh S Hiregoudar, Bangalore (IN); Srinivasa Shantharam, Bangalore (IN); Pradeep Krishnamurthy, Bangalore (IN); Raghavan Pichai, Bangalore (IN); Rohan Pasalkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 113 days.

(21) Appl. No.: 15/672,339

(22) Filed: Aug. 9, 2017

(65) Prior Publication Data

US 2018/0267894 A1    Sep. 20, 2018

(30) Foreign Application Priority Data

Mar. 14, 2017    (IN) .............................. 201741008770

(51) Int. Cl.
*G06F 12/02*    (2006.01)
*G06F 3/06*    (2006.01)

(52) U.S. Cl.
CPC ........ *G06F 12/0246* (2013.01); *G06F 3/0608* (2013.01); *G06F 3/0619* (2013.01); *G06F 3/0641* (2013.01); *G06F 3/067* (2013.01); *G06F 3/0662* (2013.01)

(58) Field of Classification Search
CPC .. G06F 12/0246; G06F 3/0608; G06F 3/0641; G06F 3/0619; G06F 3/067; G06F 3/0662
See application file for complete search history.

(56) References Cited

U.S. PATENT DOCUMENTS

| | | | |
|---|---|---|---|
| 2005/0065985 A1* | 3/2005 | Tummala | G06F 16/10 |
| 2012/0054410 A1* | 3/2012 | Vaghani | G06F 3/064 |
| | | | 711/6 |
| 2016/0018999 A1* | 1/2016 | Stenfort | G06F 3/0607 |
| | | | 711/154 |

* cited by examiner

*Primary Examiner* — Hiep T Nguyen

(57) ABSTRACT

The systems described herein are configured to enhance the efficiency of memory in a host file system with respect to hosted virtual file systems. In situations when the hosted virtual file systems use smaller file block sizes than the file block sizes of the host file system. During storage of a file, a file block is assigned a block address and unmapping bits. The block address and unmapping bits are stored in a pointer block or other similar data structure associated with the file. Particularly, the block address is stored in a first address block and the unmapping bits are stored in at least one additional address block located in proximity to the block address, such that the unmap granularity of the file is not limited by the fixed size of address blocks in the system.

20 Claims, 8 Drawing Sheets

GRANULAR UNMAPPING WITH VARIABLE ADDRESSING IN A DATA STORE

RELATED APPLICATION

Benefit is claimed under 35 U.S.C. 119(a)-(d) to Foreign Application Serial No. 201741008770 filed in India entitled "GRANULAR UNMAPPING WITH VARIABLE ADDRESSING IN A DATA STORE", filed on Mar. 14, 2017 by VMware, Inc., which is herein incorporated in its entirety by reference for all purposes.

BACKGROUND

Some existing virtual machine (VM) data stores use large block sizes (e.g., 1 MB, etc.) to reduce metadata overhead and minimize contention among hosts working on the VM data store system. The data stores are used by computing devices which host VMs that may run different guest operating systems and associated virtual file systems. Many VMs use smaller block sizes (e.g., 16 KB, etc.) for addressing than block sizes used by their host datastore (e.g., 1 MB, etc.). Ensuring that memory space of the host is used efficiently is challenging due to the difference in block sizes for addressing.

A VM running on a host that uses a smaller block size may require memory space to be allocated and/or unmapped at a granularity of the smaller block size. Identifying portions of memory space at the smaller virtual block size for allocation and/or unmapping requires additional information beyond the block address of an associated larger host file block. For instance, a VM's guest operating system may allocate/unmap data in 16K blocks. However, the file system of the host running that VM may use 64-bit block addresses and a 1 MB host block size. Therefore, each 64-bit block address may include 8 bits of data unused by the block address that may each be used as an unmapping bit for an eighth of the 1 MB host block size, yielding an unmap granularity of 128 KB, which is the maximum unmap granularity possible based on the fixed size of the addresses and address blocks in the system.

DESCRIPTION OF THE DRAWINGS

The present description will be better understood from the following detailed description read in light of the accompanying drawings, wherein:

FIGS. 1 to 8, the systems are illustrated as schematic drawings. The drawings may not be to scale.

DETAILED DESCRIPTION

Figure 1:
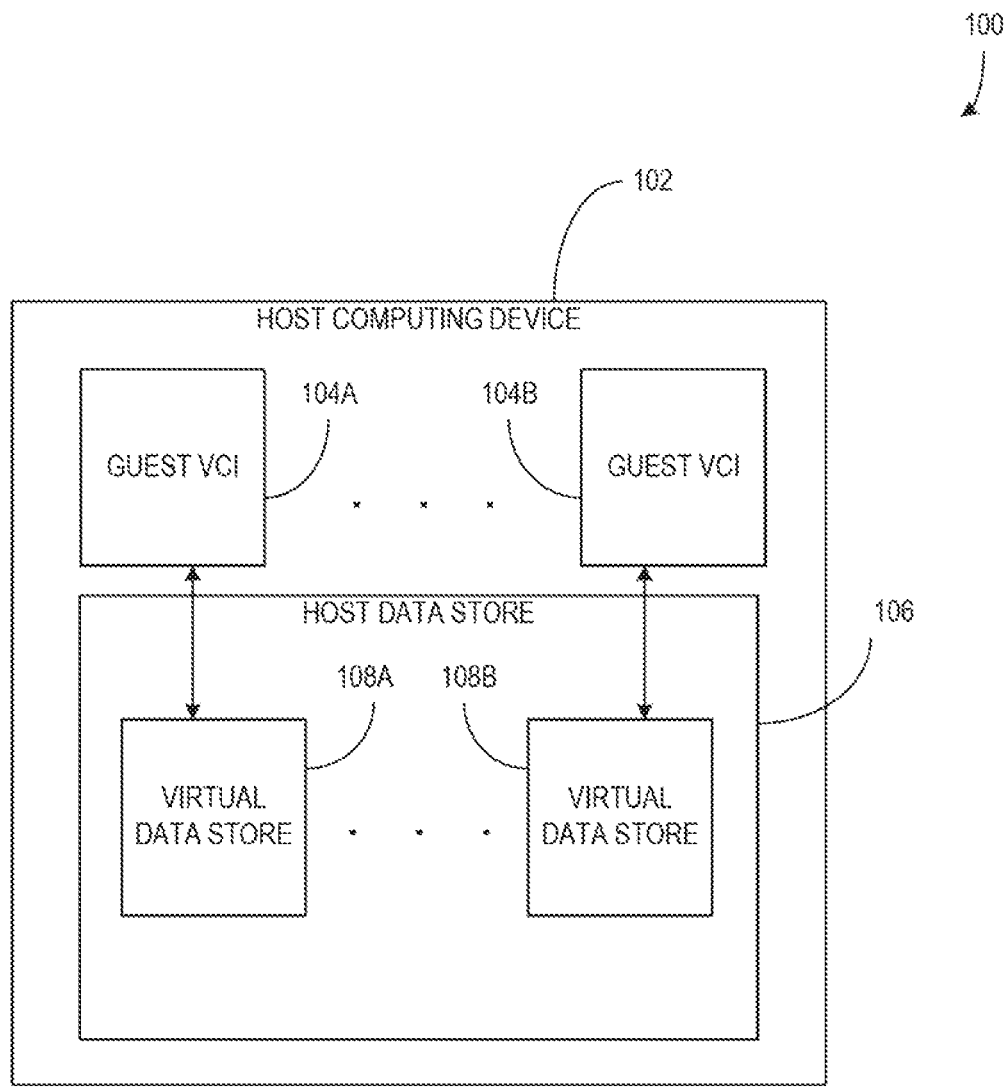
FIG. 1 illustrates a block diagram of a system including a host computing device and hosted guest virtual computing instances according to an embodiment.

The systems described below provide a variable addressing format per file in a file system that includes multiple address blocks to specify a single file block of a host file system. The multiple address blocks specifying a file block include an address that specifies the location of the file block in the file system memory space and additional address block(s) that include unmapping bits associated with portions of the file block. The unmapping bits are associated with a fractional portion of the file block based on the total number of unmapping bits of the file block (e.g., if a file block includes 64 unmapping bits, each unmapping bit is associated with a portion of the file block that is $\frac{1}{64}^{th}$ the size of the file block, etc.). When an unmapping bit is set, it indicates that the associated portion of the file block is not allocated and has been or will be unmapped. When an unmapping bit is unset, or not set, it indicates that the associated portion of the file block is allocated and should not be unmapped.

The described systems, are configured to enhance the efficiency of memory management and granular unmapping in a host file system with respect to hosted virtual computing instances (VCIs) in situations when the hosted VCI file systems use smaller file block sizes than the file block sizes of the host file system. Examples of VCIs include, but are not limited to, VMs or software containers. During storage of a file, a file block is assigned a block address and unmapping bits. The block address and unmapping bits are stored in a pointer block or other similar data structure associated with the file. Particularly, the block address is stored in a first address block and the unmapping bits are stored in at least one additional address block located in proximity to the block address, such that the unmap granularity (e.g., the minimum block size for which memory space can be unmapped, unallocated, reallocated, reclaimed, etc.) of the file is not limited by the fixed size of address blocks in the system. In some examples, the unmapping bits may be referred to as to-be-zeroed (TBZ) bits.

In a particular example, the system uses multiple addresses (e.g., multiple 64-bit addresses) to specify a single block of a VM file system (VMFS) file with the first address specifying the VMFS block address, and the rest of the addresses specifying TBZ bits for the TBZ blocks (e.g., a block of memory represented by a TBZ bit that is sized to match the unmap granularity) of the VMFS block. This enables selection of different unmap granularities for different files or VM disks (e.g., VMDKs) based on configuration or customer requirements. Based on the unmap granularity chosen for the file, the number of 64-bit addresses needed to represent a single block, in this example, is rounded to the nearest power of two.

Aspects of the disclosure are operable in systems where different unmap granularities per file are desired. For example, with the increasing use of flash arrays, lesser unmap granularities are desirable (e.g., 128 k unmap granularity is less than 1 MB unmap granularity).

FIG. 1 illustrates a block diagram of a system 100 including a host computing device 102 and hosted guest virtual computing instances 104A-104B according to an embodiment. The host computing device 102 is a computing device that includes processor(s), memory, interfaces. etc. Further, the host computing device 102 acts as host to virtual computing instances (VCIs), such as guest VCIs 104-104B. The system 100 shows two Quest VCIs 104A-104B, but it should be understood that more VCIs may be included.

The host computing device 102 includes a host data store 106. While the host data store is illustrated as being part of the host computing device 102, in some examples, the host data store 106 may be located outside of the host computing device 102, such as in a storage area network (SAN) and/or to a network-attached storage (NAS) system (e.g., via a packet network) and the host computing device 102 may connect to the host data store 106 via any type of known network (e.g., wired, wireless, cellular, etc.).

The host computing device 102 stores, on the host data store 106, data pertaining to the operation of the host computing device 102, VCI images (e.g., guest VCIs 104A-104B, etc.), VCI virtual data stores (e.g., virtual data stores 108A-108B, etc.), etc. The host computing device 102 provides a virtual platform, which is described in greater detail in FIG. 8, from which the guest VCIs 104A-104B operate according to operating systems and file systems that may be different from each other. The host data store 106 is organized to provide virtual data stores 108A-108B arranged according to the file systems of the corresponding VCIs 104A-104B. For instance, the operating system and/or file system of the guest VCI 104A may require a file block size of 16 KB, while the operating system and/or file system of the guest VCI 104B may require a file block size of 64 KB. It should be understood that, in other examples, different file block sizes (e.g., 4K, 16K, 64K, etc.) may be required by different guest VCIs while still comporting with the systems and methods described herein. Further, the host computing device 102 includes an operating system and file system with requirements that may be substantially different from those of the hosted VCIs. An example of a host-device operating system and file system includes, but is not limited to, the ESXi hypervisor by VMware running VMFS. In an example, the file block size used by the host computing device 102 is larger than the file block size typically used by hosted VCIs. To compensate for these differences, the host computing device 102 abstracts the host computing device file system, such that hosted VCIs are presented with file system organizations, such as block sizes, that meet the requirements of the guest OS of the VCI while the virtual files are physically stored according to the file system of the host computing device 102.

Figure 2:
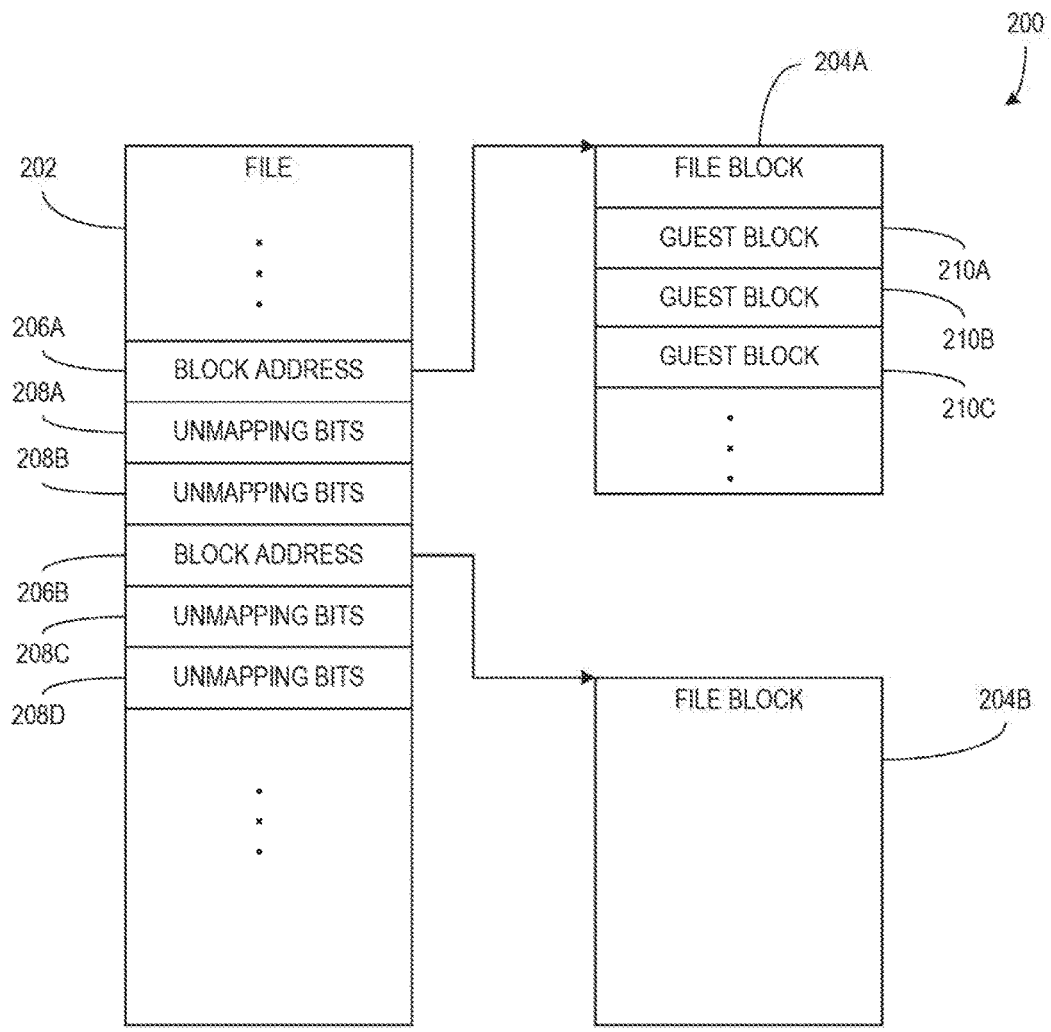
FIG. 2 illustrates a block diagram of a file memory space and associated file blocks organized in a direct addressing mode according to an embodiment.

FIG. 2 illustrates a block diagram 200 of a the memory space 202 (e.g., on-disk representation of a file, such as an "inode", which includes file metadata and addressing information, etc.) and associated file blocks 204A-204B organized in a direct addressing mode according to an embodiment. The file memory space 202 is the primary on-disk location of the file and associated metadata, but because the file is stored according to the direct addressing mode, the data of the file is stored elsewhere in memory in the form of file blocks (e.g., file blocks 204A-404B, etc.).

A pointer block (e.g., a file system resource allocated to a file that stores addresses associated with the locations of other pointer blocks and/or file blocks in memory, etc.) of the file memory space 202 includes block addresses 206A-206B that point to file blocks 204A-204B respectively. While FIG. 2 shows only two block addresses and file blocks, more, fewer, or different combinations of block addresses and file blocks may be included with the file in other examples. Each block address in the file memory space 202 is stored in a fixed size address block defined by the file system of the host computing device (e.g., host computing device 102, etc.). For instance, file system may use fixed block address sizes of 32 bits, 64 bits, or the like. The system of FIG. 2 may implement direct addressing, an address mode in VMFS, wherein the file memory space 202 (e.g., the inode or other on-disk representation of the file) includes addresses of file blocks of the file.

Further, the file memory space 202 includes unmapping bits 208A-208D, which indicate unmapping statuses of portions of associated file blocks, stored in the file memory space 202 in the address block(s) after an associated block address. For instance, unmapping bits 208A-208B are associated with block address 206A and unmapping bits 208C-208D are associated with block address 206B. The unmapping bits 208A-208D include bits that represent an unmapping status of a portion of the file block corresponding to the associated block address. In the illustrated example, unmapping bits 208A-208B represent unmapping statuses of portions of file block 204A, as it is associated with block address 206A.

The unmapping bits (e.g., unmapping bits 208A-208D, etc.) are stored in the fixed size address blocks like the associated block addresses. In some examples, the address block size provides sufficient unmapping bits that only one address block after each block address is occupied by unmapping bits (e.g., in a system with 64-bit address block size, a file that requires 64 or fewer unmapping bits has a single address block of unmapping bits after each block address). Alternatively, if a single address block does not provide enough unmapping bits, a file may include more address blocks of unmapping bits after each block address (e.g., in a system with 32-bit address block size, a file that requires 120 unmapping bits includes four address blocks of unmapping bits after each block address, with the last address block of unmapping bits being partially used). The number of address blocks used to store unmapping bits after each block address is defined as the granularity shift of the file. The granularity shift of the file may be stored in the metadata of the file in the file memory space 202 during file creation and may be used to identify address blocks that contain addresses and/or address blocks that contain unmapping bits. Only the addresses that are pointing to the data block of the file (e.g., leaf addresses) will have multiple addresses representing the block. The addresses in other levels will still have only an address (e.g., 64-bit address) to point the next level pointer blocks. Address resolution code refers to the corresponding address entry based on the addressing level and the granularity shift.

While FIG. 2 illustrates two sets of unmapping bits with each block address, in other examples, more, fewer, or different numbers and/or sets of unmapping bits may be associated with each block address. Files may be created with a number of address blocks allotted for unmapping bits based on the requirements of the file and/or the virtual file system in which it belongs. As a result, different files may have different unmap granularities and, therefore, different numbers of address blocks allotted for unmapping bits after each block address. While the use of additional address blocks to store unmapping bits may reduce the quantity of file blocks that can be accessed, the improved unmap granularity provided enhances the efficiency and flexibility of memory usage with respect to VCIs hosted on host computing devices.

The portions of the file block 204A that are represented by the unmapping bits 208A-208B are guest blocks 210A-210C. The unmap status of each of the guest blocks of a file block is represented by an unmapping bit such that, when a guest block is accessed, the system can determine whether the guest block is mapped or unmapped. If the unmapping bit indicates that a guest block is mapped (e.g., the unmapping bit is "unset"), then the guest block is allocated for use and should not be unmapped. A mapped guest block may be read from disk during a read operation and provide the data stored therein. However, if the unmapping bit indicates that the guest block is unmapped (e.g., the unmapping bit is "set"), the guest block is unallocated and may safely be allocated, edited, erased, etc. An unmapped guest block, when read during a read operation, provides zeroes, as the guest block is unallocated. Further, the guest block may be overwritten with zeroes when unmapped and/or when a read operation accesses the unmapped guest block.

For instance, a system may include 1 MB host block size, 4 KB guest block size, and 64-bit address block size. In order to provide an unmap granularity of 4 KB to match the guest block size, each host file block must be associated with 256 unmapping bits (1 MB/4 KB), or four address blocks worth of unmapping bits, in addition to the address block containing the address of the host file block. When a read operation occurs on the host file block, the unmapping bits of the portions of the host file block to be read are consulted to determine whether the portions to be read are mapped or unmapped as described. If a portion is mapped, then data may be read from the portion, but if the portion is unmapped, then zeroes are returned for that portion of the read operation.

In art example, guest blocks 210A-210C in file block 204A are of a defined size based on the requirements of a VCI (e.g., guest VCI 104A, etc.) hosted an the host, computing device (e.g., host computing device 102, etc.). The VCI requires smaller file blocks than the host computing device block size, such that a plurality of guest blocks fit in a host file block. Because each guest block has an associated unmapping bit, the minimum block size for which space can be unmapped, reallocated, or the like is the defined size of the guest blocks. This value is also known as the unmap granularity of the file. The file may store the unmap granularity in the metadata of the file in the file memory space 202.

For instance, a host computing device may use a file block size of 1 MB while a hosted VCI requires a block size of 16 KB. In order to support unmapping portions, or guest blocks, of a 1 MB file at a granularity of 16 KB, the 1 MB file block is divided into 64 guest blocks of 16 KB and each guest block is associated with an unmapping bit, for a total of 64 unmapping bits, if the host computing device uses 64-bit address blocks, one address block would be used to store unmapping bits after each block address in the file memory space 202 for an unmap granularity of 16 KB and a granularity shift of one. Alternatively, if the host computing device uses 32-bit address blocks, two address blocks would be used to store unmapping bits after each block address in the file memory space 202 for an unmap granularity of 16 KB and a granularity shift of two.

Figure 3:
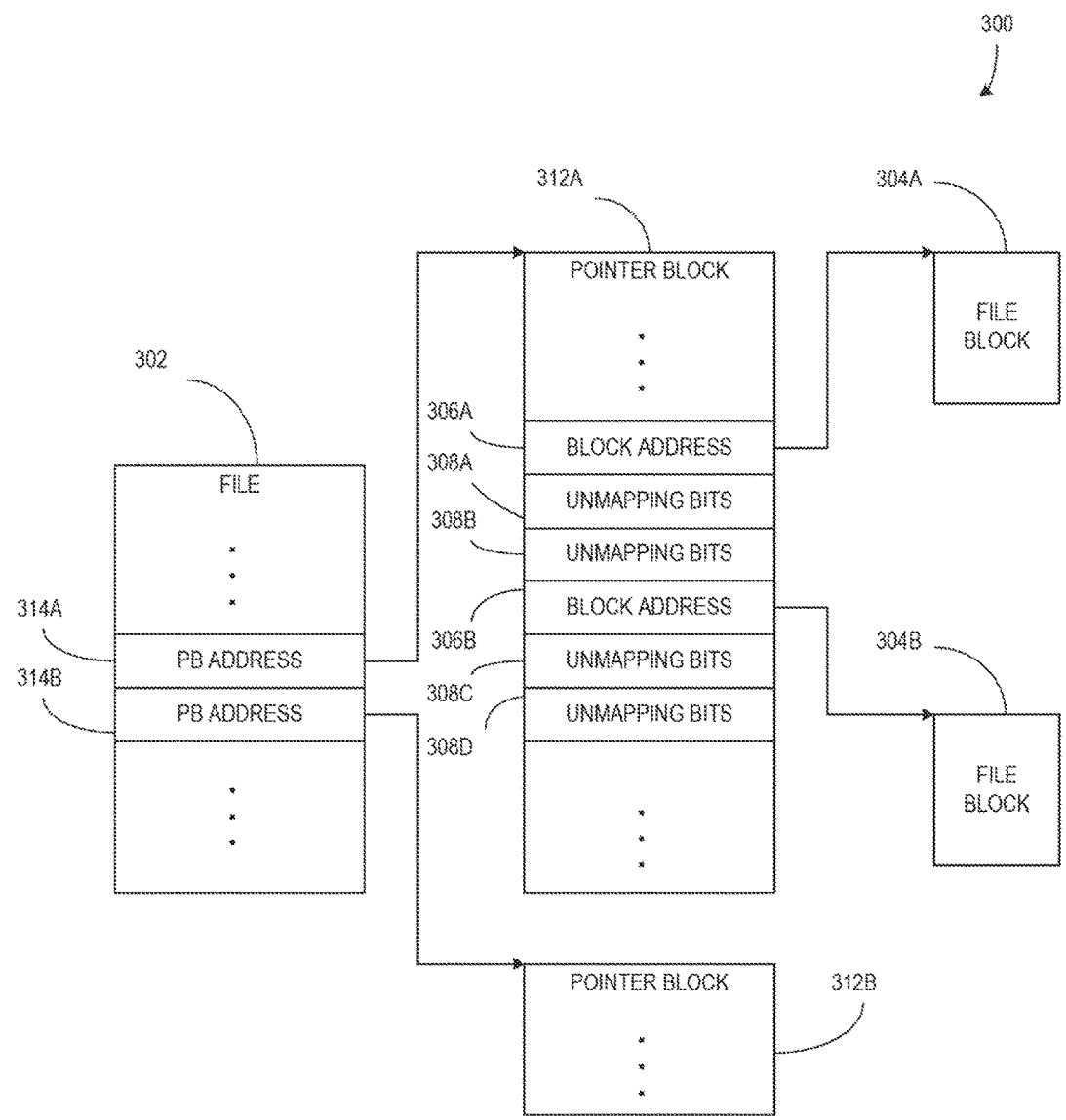
FIG. 3 illustrates a block diagram of a file memory space and associated file blocks organized in a single indirect addressing mode according to an embodiment.

FIG. 3 illustrates a block diagram of a file memory space 302 (e.g., inode, etc.) and associated file blocks 304A-304B organized in a single indirect addressing mode according to an embodiment. The file of FIG. 3 includes block addresses 306A-306B pointing to file blocks 304A-304B and unmapping bits 308A-308D associated with the block addresses 306A-306B as described above with respect to FIG. 2. However, in single indirect addressing mode, the block addresses and unmapping bits are not stored in the primary memory space 302 of the file, instead, the block addresses and unmapping bits are stored in level one indirect pointer blocks 312A-312B. The pointer block portion of the file memory space 302 stores pointer block addresses 314A-314B, which point to the respective pointer blocks 312A-312B. Further, the pointer block portion of the file memory space 302 does not store unmapping bits in single indirect addressing mode. In some examples, the pointer blocks 312A-312B may be a fixed size, regardless of how many address blocks are used to store unmapping bits, such that the pointer blocks may store fewer block addresses when more address blocks of the pointer blocks are allocated for unmapping bit storage. Single indirect addressing mode (e.g., an address mode in VMFS, etc.) provides a level of abstraction between the primary file memory space 302 and the file blocks 304A-304B themselves and may provide enhanced flexibility in memory allocation.

Figure 4:
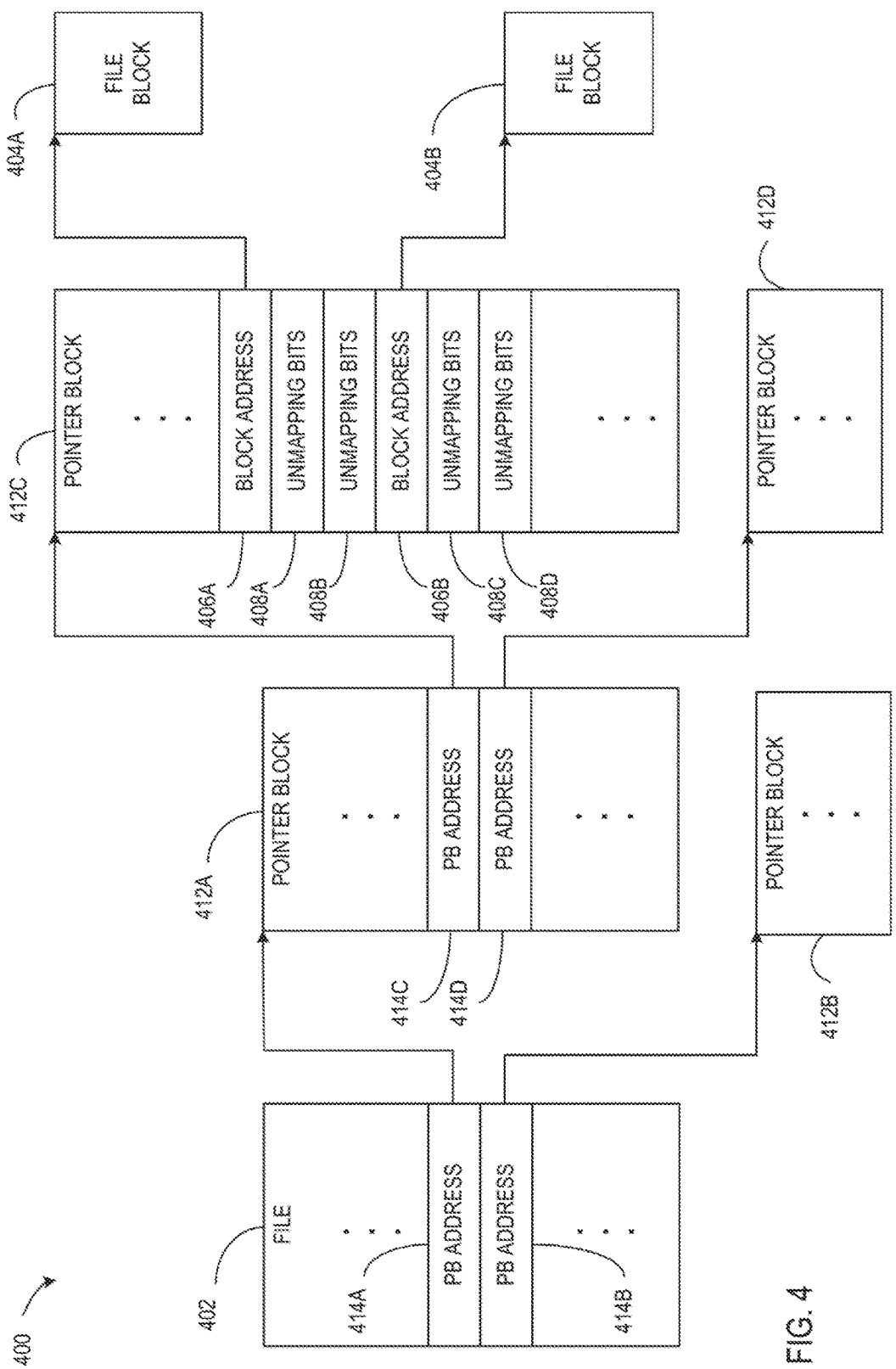
FIG. 4 illustrates a block diagram of a file memory space and associated file blocks organized in a double indirect addressing mode according to an embodiment.

FIG. 4 illustrates a block diagram of a file memory space 402 (e.g., mode, etc.) and associated file blocks 404A-404B organized in a double indirect addressing mode according to an embodiment. As with FIG. 2, the file blocks 404A-404B are associated with block addresses 406A-406B and unmapping bits 408A-408D as described above. However, in double indirect addressing mode, the pointer block portion of the file memory space 402 stores pointer block addresses to level two indirect pointer blocks 412A-412B. Further, the level two indirect pointer blocks 412A-412B store pointer block addresses to level one indirect pointer blocks 412C-412D. The level one indirect pointer blocks 412C-412D store the block addresses 406A-406B and unmapping bits 408A-408D. In some examples, the pointer blocks 412A-412B and 412C-412D may be a fixed size. The pointer blocks 412C-412D may store fewer block addresses based on how many address blocks of the pointer blocks 412C-412D are allocated for unmapping bit storage. Double indirect addressing mode provides further abstraction and may provide even greater flexibility in memory allocation.

Figure 5:
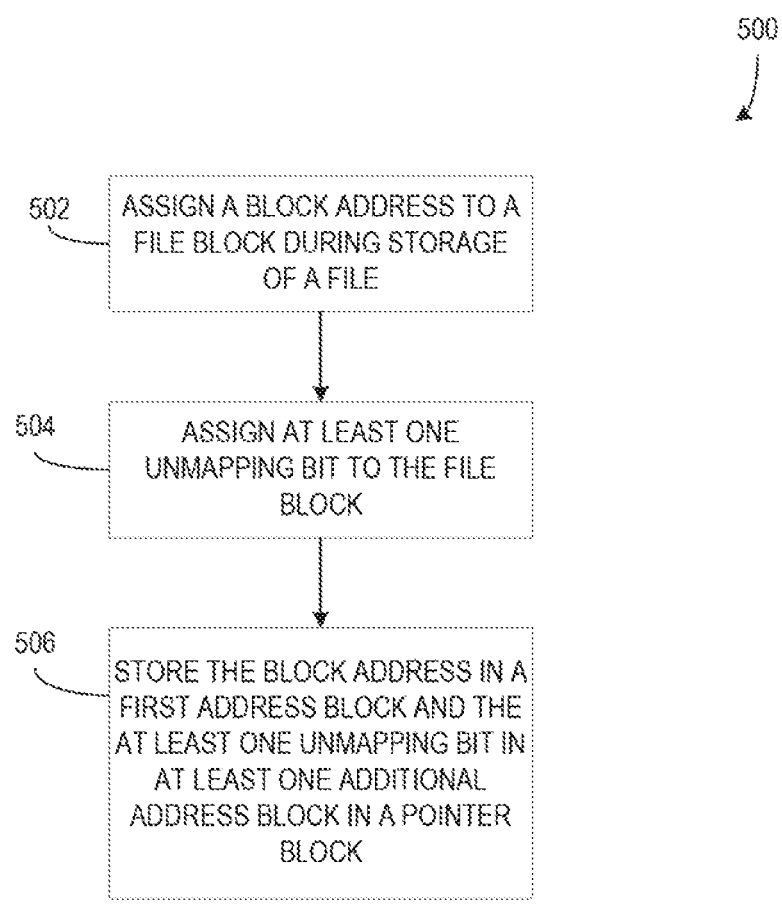
FIG. 5 illustrates a flow chart of a method of storing a block address and unmapping bits of a file block during storage of a file according to an embodiment.

FIG. 5 illustrates a flow chart of a method 500 of storing a block address and unmapping bits of a file block during storage of a file according to an embodiment. At 502, a block address is assigned to a file block during storage of a file. The block address points to a location in on-disk memory where the file block will be stored. A block address may be chosen for assignment based on identifying free space in the on-disk memory that will accommodate the file block and/or other data associated with the file to be stored. For instance, a host computing device may determine a location to store a file block based on free memory resources in the location as well as proximity to other file blocks of the same file or related files.

At 504, unmapping bits are assigned to the file block. Each of the unmapping bits assigned represents a portion (e.g., a guest block, etc.) of the file block. The number of unmapping bits assigned is based on the unmap granularity of the file and the size of the file block. As described above, a 1 MB file block with an unmap granularity of 16 KB requires 64 unsnapping bits. In the act of storing the file, the host computing device or other computing device has information regarding the file block size of the host file system, the guest block size of the hosted virtual file system, and the address block size of the host system.

Assigning unmapping bits may include selling the unmapping bits to a default state. In an example, at least some of the unmapping bits are unset, indicating that the corresponding guest blocks are mapped, or allocated. Alternatively, or additionally, at least some of the unmapping bits are set, indicating that the corresponding guest blocks are unmapped, free, or unallocated.

The block address and unmapping bits are stored in on-disk memory at 506. The block address is stored in a first address block and the unmapping bits are stored in additional blocks after the block address. If the number of unmapping bits does not exceed the number of bits in an address block, only one additional block is used. Alternatively, if the number of unmapping bits exceeds the number of bits in an address block, more than one address block must be used.

In an example, metadata of the file is stored in on-disk memory allocated to the file. The metadata may include an unmap block size or guest block size, an unmap granularity, an unmap granularity shift, or a combination thereof.

Figure 6:
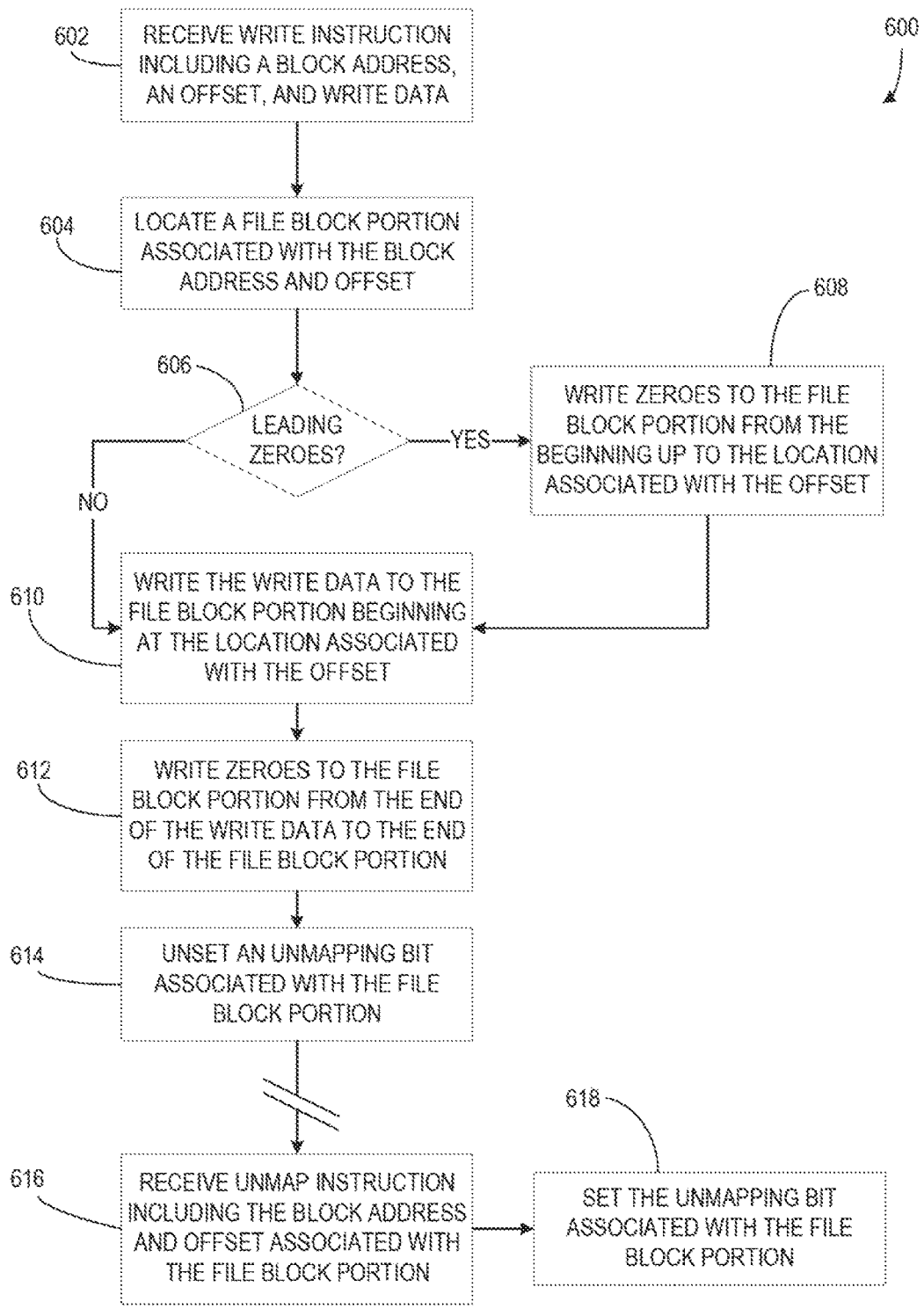
FIG. 6 illustrates a flow chart of a method of writing data to an unmapped file block portion and, later, unmapping the file block portion according to an embodiment.

FIG. 6 illustrates a flow chart of a method 600 of writing data to an unmapped file block portion and, later, unmapping the file block portion according to an embodiment. At 602, a host computing device (e.g., host computing device 102, etc.) or the like receives a write instruction that includes a block address, an offset, or offset value, and write data. The block address represents a file block that the write data is to be written to. The offset is a value that represents, or paints to, a location in the file block memory past the beginning of the file block. For instance, if the offset is 256 KB, the write data is to be written to a location in the file block that is 256 KB, or the like, past the beginning of the file block. The write data includes data intended to be written at the location identified by the block address and the offset.

At 604, a file block portion associated with the block address and offset is located. The file block portion may be a guest block that includes the location indicated by the block address and offset. In an example, locating the file block portion, or guest block, includes identifying an unmapping bit associated with the located file block portion and determining whether the file block portion is set or unset for unmapping.

It is determined whether leading zeroes are necessary for the located file block portion at 606. If the block address and the offset point to a location in the middle of the located file block portion, leading zeroes may be added to the file block portion from a location at the beginning of the file block portion up to the location identified by the offset at 608. In some examples, leading zeroes are added to the beginning of the file block portion when the unmapping bit of the file block portion is set, indicating that the file block portion is unallocated. In that case, zeroing out the first part of the file block portion clears any data that may be left over from a previous allocation. For instance, if the file block portion to be written is 1 MB, and the offset indicates the file data to write should be written at 256 KB into the file block portion, the file block portion is initialized with zeroes from a zero location in the file block portion to a 256 KB location in the file block portion.

Alternatively, if the unmapping bit of the file block portion is unset, indicating that the file block portion is allocated, or if leading zeroes are not necessary if the offset points to the beginning location of the file block portion, etc.), no leading zeroes are written to the file block portion.

At 610, the write data is written to the file block portion beginning at the location associated with the offset. The write data is written sequentially to the file block portion from the location associated with the offset until the end of the write data. Alternatively, a partial amount of the write data may be written when the file block portion is not large enough for the write data, etc. For instance, the file data may be written from a 256 KB location in the file block portion to a 320 KB location in the file block portion.

At 612, zeroes are written to the file block portion from the end of the write data to the end of the file block portion. As with the leading zeroes above, zeroes written to the end of the file block portion may only be included when the unmapping bit of the file block portion is set, indicating that the file block portion is not allocated. Alternatively, if the unmapping bit of the file block portion is unset, or if the end of the write data lines up with the end of the file block portion, no zeroes may be written to the end of the file block portion at 612. In an example, zeroes may be written to the file block portion from a 320 KB location of the file block portion to a 1 MB location of the file block portion.

The unmapping bit of the file block portion is unset at 614, indicating that, due to the write instruction, the file block portion is allocated, or mapped.

Subsequently, as indicated by the broken connection, the host computing device may receive an unmap instruction including the block address of the file block and an offset associated with the file block portion at 616. As a result of the received unmap instruction, the unmapping bit associated with the file block portion is set at 648, indicating that the file block portion is unallocated. Further use of the file block portion will be based on the assumption that the file block portion is unmapped, or not allocated.

Figure 7:
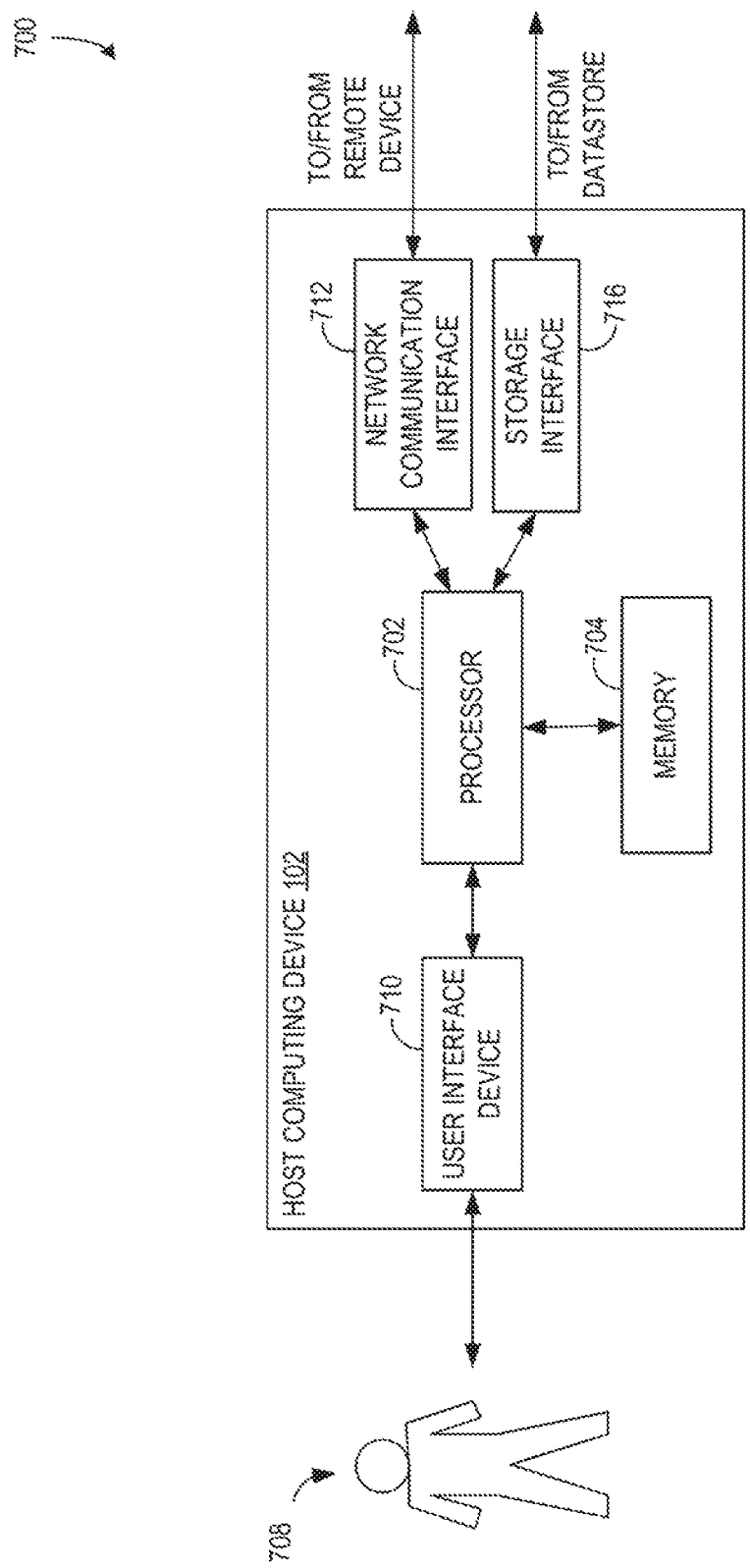
FIG. 7 illustrates a block diagram of an exemplary host computing device.

FIG. 7 is a block diagram of an example host computing device 102. Host computing device 102 includes a processor 702 for executing instructions. In some examples, executable instructions are stored in a memory 704. Memory 704 is any device allowing information, such as executable instructions and/or other data, to be stored and retrieved. For example, memory 704 may include one or more random access memory (RAM) modules, flash memory modules, hard disks, solid state disks, and/or optical disks.

Computer executable instructions may be provided using any computer-readable media that are accessible by the host computing device 102. Computer-readable media may include, for example, computer storage media such as a memory 704 and communications media. Computer storage media, such as a memory 704, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can he used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 704) is shown within the host computing device 102, it will be appreciated by a person skilled in the art, that the storage may be distributed or located remotely and accessed via a network or other communication link (e.g. using a network communication interface 712).

Host computing device 102 may include a user interface device 710 for receiving data from a user 708 and/or for presenting data to user 708. User 708 may interact indirectly with host computing device 102 via another computing device such as a device running VMware's vCenter Server or other management device. User interface device 710 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 710 operates to receive data from user 708, while another device (e.g., a presentation device) operates to present data to user 708. In other examples, user interface device 710 has a single component, such as a touch screen, that functions to both output data to user 708 and receive data from user 708. In such examples user interface device 710 operates as a presentation device for presenting information to user 708. In such examples, user interface device 710 represents any component capable of conveying information to user 708. For example, user interface device 710 may include, without limitation, a display device (e.g., a liquid crystal display (LCD), organic light emitting diode (OLED) display, or "electronic ink" display) and/or an audio output device (e.g., a speaker or headphones). In some examples, user interface device 710 includes an output adapter, such as a video adapter and/or an audio adapter. An output adapter is operatively coupled to processor 702 and configured to be operatively coupled to an output device, such as a display device or an audio output device.

Host computing device 102 also includes a network communication interface 712, which enables host computing device 102 to communicate with a remote device (e.g., another computing device) via a communication medium, such as a wired or wireless packet network. For example, host computing device 102 may transmit and/or receive data via network communication interface 712. User interface device 710 and/or network communication interface 712 may be referred to collectively as an input interface and may be configured to receive information from user 708.

Host computing device 102 further includes a storage interface 716 that enables host computing device 102 to communicate with one or more data storage devices, which store virtual disk images, software applications, and/or any other data suitable for use with the methods described herein. In example examples, storage interface 716 couples host computing device 102 to a storage area network (SAN) (e.g., a Fibre Channel network) and/or to a network-attached storage (NAS) system (e.g., via a packet network). The storage interface 716 may be integrated with network communication interface 712.

The functionality described herein can be performed, at least in part, by one or more hardware logic components. According to an embodiment, the host computing device 102 is configured by the program code when executed by the processor 702 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as personal computers, servers, mobile devices, laptop computers, tablet computers, etc.

Figure 8:
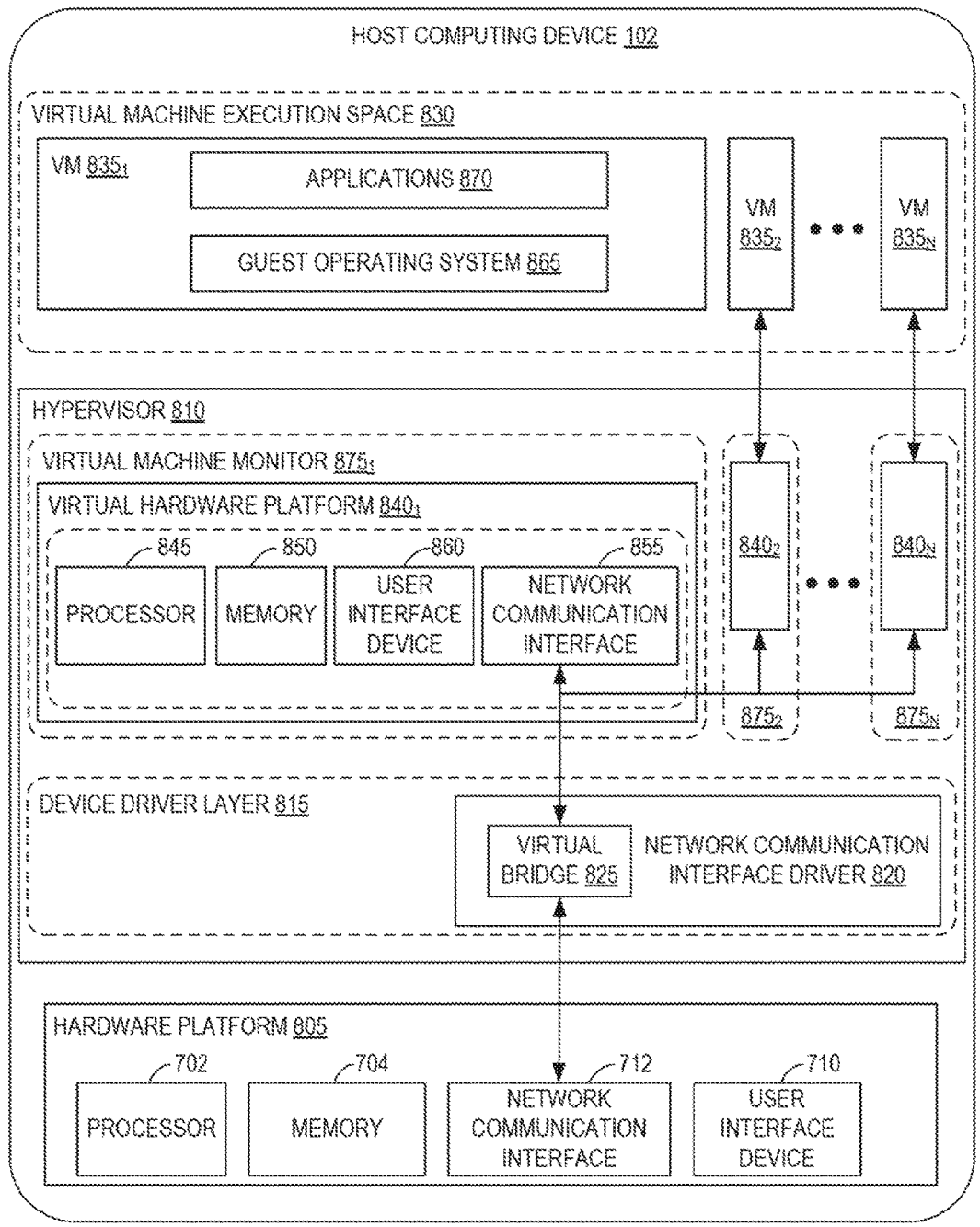
FIG. 8 illustrates a block diagram of VMs that are instantiated on a computing device, such as the host computing device shown in FIG. 7.

FIG. 8 depicts a block diagram of VMs $835_1$, $835_2$ . . . $835_N$ that are instantiated on host computing device 102. Host computing device 102 includes a hardware platform 805, such as an x86 architecture platform. Hardware platform 805 may include processor 702, memory 704, network communication interface 712, user interface device 710, and other input/output (I/O) devices, such as a presentation device. A virtualization software layer, also referred to hereinafter as a hypervisor 810, is installed on top of hardware platform 805.

The virtualization software layer supports a VM execution space 830 within which multiple VMs (VMs $835_1$-$835_N$) may be concurrently instantiated and executed. Hypervisor 810 includes a device driver layer 815, and maps physical resources of hardware platform 805 (e.g., processor 702, memory 704, network communication interface 712, and/or user interface device 710) to "virtual" resources of each of VMs $835_1$-$835_N$ such that each of VMs $835_1$-$835_N$ has its own virtual hardware platform a corresponding one of virtual hardware platforms $840_1$-$840_N$), each virtual hardware platform having its own emulated hardware (such as a processor 845, a memory 850, a network communication interface 855, a user interface device 860 and other emulated I/O devices in VM $835_1$). Hypervisor 810 may manage (e.g., monitor, initiate, and/or terminate) execution of VMs $835_1$-$835_N$ according to policies associated with hypervisor 810, such as a policy specifying that VMs $835_1$-$835_N$ are to he automatically restarted upon unexpected termination and/or upon initialization of hypervisor 810. In addition, or alternatively, hypervisor 810 may manage execution VMs $835_1$-$835_N$ based on requests received from a device other than host computing device 102. For example, hypervisor 810 may receive an execution instruction specifying the initiation of execution of first VM $835_1$ from a management device via network communication interface 712 and execute the execution instruction to initiate execution of first VM $835_1$.

In some examples, memory 850 in first virtual hardware platform $840_1$ includes a virtual disk that is associated with or "mapped to" one or more virtual disk images stored on a disk (e.g., a hard disk or solid state disk) of host computing device 102. The virtual image represents a file system (e.g. a hierarchy of directories and files) used by first VM $835_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 815 includes, for example, a communication interface driver 820 that interacts with network communication interface 712 to receive and transmit data from, for example, a local area network (LAN) connected to host computing device 102. Communication interface driver 820 also includes a virtual bridge 825 that simulates the broadcasting of data packets in a physical network received from one communication interface (e.g., network communication interface 712) to other communication interfaces (e.g., the virtual communication interfaces of VM $835_1$-$835_N$). Each virtual communication interface for each VM $835_1$-$835_N$, such as network communication interface 855 for first VM $835_1$, may be assigned a unique virtual Media Access Control (MAC) address that enables virtual bridge 825 to simulate the forwarding of incoming data packets from network communication interface 712. In an example, network communication interface 712 is an Ethernet adapter that is configured in "promiscuous mode" such that all Ethernet packets that it receives (rather than just Ethernet packets addressed to its own physical MAC address) are passed to virtual bridge 825, which, in turn, is able to further forward the Ethernet packets to VMs $835_1$-$835_N$. This configuration enables an Ethernet packet that has a virtual MAC address as its destination address to properly reach the VM in host computing device 102 with a virtual communication interface that corresponds to such virtual MAC address.

Virtual hardware platform $840_1$ may function as an equivalent of a standard x86 hardware architecture such that tang x86-compatible desktop operating system Microsoft WINDOWS brand operating system, LINUX brand operating system, SOLARIS brand operating system, NETWARE, or FREEBSD) may be installed as guest operating system (OS) 865 in order to execute applications 870 for an instantiated VM, such as first VM $835_1$. Virtual hardware platforms $840_1$-$840_N$ may be considered to be part of VM monitors (VMM) $875_1$-$875_N$ that implement virtual system support to coordinate operations between hypervisor 810 and corresponding VMs $835_1$-$835_N$. Those with ordinary skill in the art will recognize that the various terms, layers, and categorizations used to describe the virtualization components in FIG. 8 may be referred to differently without departing from their functionality or the spirit or scope of the disclosure. For example, virtual hardware platforms $840_1$-$840_N$ may also be considered to be separate from VMMs $875_1$-$875_N$, and VMMs $875_1$-$875_N$ may be considered to be separate from hypervisor 810. One example of hypervisor 810 that may be used in an example of the disclosure is included as a component in VMware's ESX brand software, which is commercially available from VMware, Inc.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device', 'computing device' and the like are used herein to refer to any device with processing capability such that it can execute instructions. Those skilled in the art will realize that such processing capabilities are incorporated into many different devices and therefore the terms 'computer', 'computing device', and 'computing apparatus' each may include PCs, servers, laptop computers, mobile telephones (including smart phones), tablet computers, and many other devices.

While some virtualized embodiments are described with reference to VMs for clarity of description, the disclosure is operable with other forms of virtual computing instances (VCIs). A VCI may be a VM, a container, and/or any other type of virtualized computing instance.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for dynamically addressing file blocks in a VM file data store. The illustrated one or more processors 702 together with the computer program code stored in memory 704 constitute exemplary processing means for assigning block addresses and unmapping bits to file blocks during storage of a file and storing the block addresses unmapping bits in separate address blocks such that the unmap granularity of a stored file is not limited by address block size.

The term "comprising" is used in this specification to mean including the feature(s) or act(s) followed thereafter, without excluding the presence of one or more additional features or acts.

What is claimed is:

1. A system for providing variable addressing in a data store to enable granular unmapping, said system comprising;
   at least one physical processor; and
   at least one memory comprising computer program, code,
   the at least one memory and the computer program code configured to, with the at least one physical processor, cause the processor to at least:

assign a block address to a file block in a file system memory space during storage of a file, the file block representing at least a portion of the file, the block address indicating a location of the file block in the file system memory space;

assign at least one unmapping bit to the file block, the at least one unmapping bit representing a portion of the file block; and store the block address in a first address block and the at least one unmapping bit in at least one additional address block in a pointer block in the file system memory space, such that, during a subsequent unmap operation, unmap granularity of the file block is not limited by a size of the first address block.

2. The system of claim 1, wherein the at least one memory and the computer program code are configured to, with the at least one processor, further cause the processor to at least:

receive an instruction to unmap at least one portion of the file block, the at least one portion represented by at least one unmapping bit; and set the at least one um napping bit representing the at least one portion of the file block to be unmapped, such that the at least one unmapping bit representing the at least one portion indicates that the at least one portion is unmapped.

3. The system of claim 1, wherein the at least one unmapping bit assigned to the file block is unset, such that the at least one unmapping bit indicates that the at least one portion of the file block is mapped.

4. The system of claim 1, wherein the at least one memory and the computer program code are configured to, with the at least one processor, further cause the processor to at least write at least one of an unmap block size, an unmap granularity, or an unmap granularity shift to metadata of the file.

5. The system of claim 1, wherein the at least one memory and the computer program code are configured to, with the at least one processor, further cause the processor to at least:

receive an instruction to write to a portion of the file block, the portion represented by an unmapping bit that is set, the instruction including write data and an offset value;

write zeroes to the portion from a beginning memory location of the portion to a memory location of the portion corresponding to the offset value when the offset value points to a location past the beginning memory location;

write the write data to the portion from a memory location of the portion corresponding to the offset value to a memory location corresponding to an end of the write data; and write zeroes to the portion from the memory location corresponding to the end of the write data to an end memory location of the portion when the portion includes at least one memory location beyond the memory location corresponding to end of the write data.

6. The system of claim 1, wherein the at least one memory and the computer program code are configured to, with the at least one processor, further cause the processor to at least store an address of the pointer block in an indirect pointer block.

7. The system of claim 6, wherein the at least one memory and the computer program code are configured to, with the at least one processor, further cause the processor to at least store an address of the indirect pointer block in a second level indirect pointer block.

8. A computerized method comprising:

assigning, by a processor, a block address to a file block in a file system memory space during storage of a file, the file block representing at least a portion of the file, the block address indicating a location of the file block in the file system memory space;

assigning, by the processor, at least one unmapping bit to the file block, the at least one unmapping bit representing a portion of the file block; and storing, by the processor, the block address in a first address block and the at least one unmapping bit in at least one additional address block in a pointer block in the file system memory space, such that, during a subsequent unmap operation, unmap granularity of the file block is not limited by a size of the first address block.

9. The computerized method of claim 8, further comprising:

receiving, by the processor, an instruction unmap at least one portion of the file block, the at least one portion represented by at least one unmapping bit; and setting the at least one unmapping bit representing the at least one portion of the file block to be unmapped, such that the at least one unmapping bit representing the at least one portion indicates that the at least one portion is unmapped.

10. The computerized method of claim 8, wherein the at least one unmapping bit assigned to the file block is unset, such that the at least one unmapping bit indicates that the at least one portion of the file block is mapped.

11. The computerized method of claim 8, further comprising writing, by the processor, at least one of an unmap block size, an unmap granularity, or an unmap granularity shift to metadata of the file.

12. The computerized method of claim 8, further comprising:

receiving, by the processor, an instruction to write to a portion of the file block, the portion represented by an unmapping bit that is set, the instruction including write data and an offset value;

writing, by the processor, zeroes to the portion from a beginning memory location of the portion to a memory location of the portion corresponding to the offset value when the offset value points to a memory location past the beginning memory location;

writing, by the processor, the write data to the portion from a memory location of the portion corresponding to the offset value to a memory location corresponding to an end of the write data; and writing, by the processor, zeroes to the portion from the memory location corresponding to the end of the write data to an end memory location of the portion when the portion includes at least one memory location beyond the memory location corresponding to the end of the write data.

13. The computerized method of claim 8, further comprising storing, by the processor, an address of the pointer block in an indirect pointer block.

14. The computerized method of claim 13, further comprising storing, by the processor, an address of the indirect pointer block in a second level indirect pointer block.

15. One or more non-transitory computer storage media having computer-executable instructions that, upon execution by a processor, cause the processor to at least:

assign a block address to a file block in a file system memory space during storage of a file, the file block representing at least a portion of the file, the block address indicating a location of the file block in the file system memory space;

assign at least one unmapping bit to the file block, the at least one unmapping bit representing a portion of the file block; and store the block address in a first address block and the at least one unmapping bit in at least one additional address block in a pointer block in the file system memory space, such that, during a subsequent unmap operation, unmap granularity of the file block is not limited by a size of the first address block.

16. The one or more non-transitory computer storage media of claim 15, having computer-executable instructions that, upon execution by a processor, further cause the processor to at least:

receive an instruction to unmap at least one portion of the file block, the at least one portion represented by at least one unmapping bit; and set the at least one unmapping bit representing the at least one portion of the file block to be unmapped, such that the at least one unmapping bit representing the at least one portion indicates that the at least one portion is unmapped.

17. The one or more computer storage media of claim 15, wherein the at least one unmapping bit assigned to the file block is unset, such that the at least one unmapping bit indicates that the at least one portion of the file block is mapped.

18. The one or more computer storage media of claim 15, having computer-executable instructions that, upon execution by a processor, further cause the processor to at least write at least one of an unmap block size, an unmap granularity, or an unmap granularity shift to metadata of the file.

19. The one or more non-transitory computer storage media of claim 15, having computer-executable instructions that, upon execution by a processor, further cause the processor to at least:

receive an instruction to write to a portion of the file block, the portion represented by an unmapping bit that is set, the instruction including write data and an offset value;

write zeroes to the portion from a beginning memory location of the portion to a memory location of the portion corresponding to the offset value when the offset value points to a memory location past the beginning memory location;

write the write data to the portion from a memory location of the portion corresponding to the offset value to a memory location corresponding to an end of the write data; and write zeroes to the portion from the memory location corresponding to the end of the write data to an end memory location of the portion when the portion includes at least one memory location beyond the memory location corresponding to the end of the write data.

20. The one or more non-transitory computer storage media of claim 15, having computer-executable instructions that, upon execution by a processor, further cause the processor to at least store an address of the pointer block in an indirect pointer block.

* * * * *